Jan. 31, 1928.
E. M. CROSLAND
1,657,959
OVEN FOR BAKING, DRYING, AND OTHER HEATING OPERATIONS
Filed Jan. 18, 1927   5 Sheets-Sheet 1
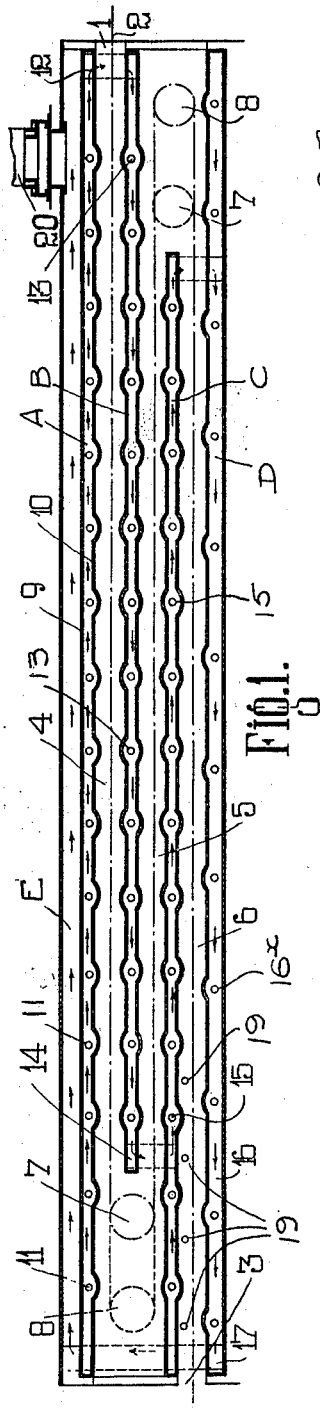
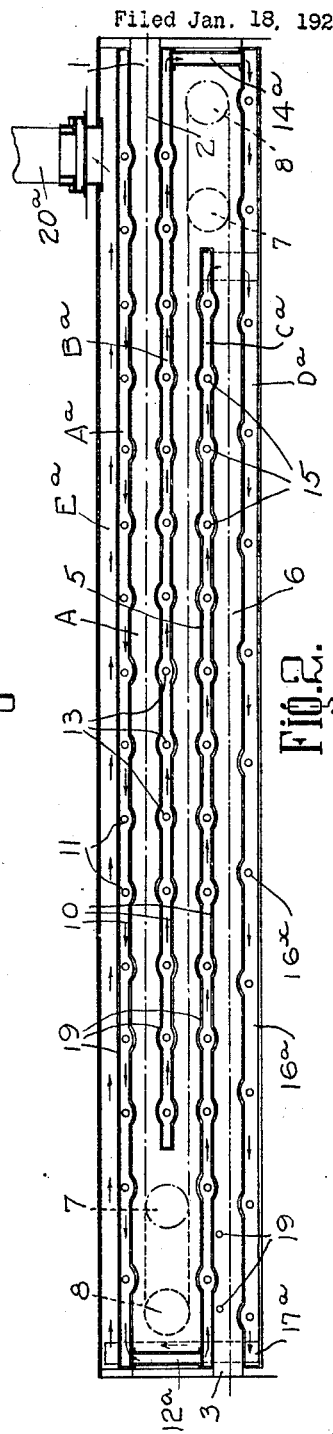
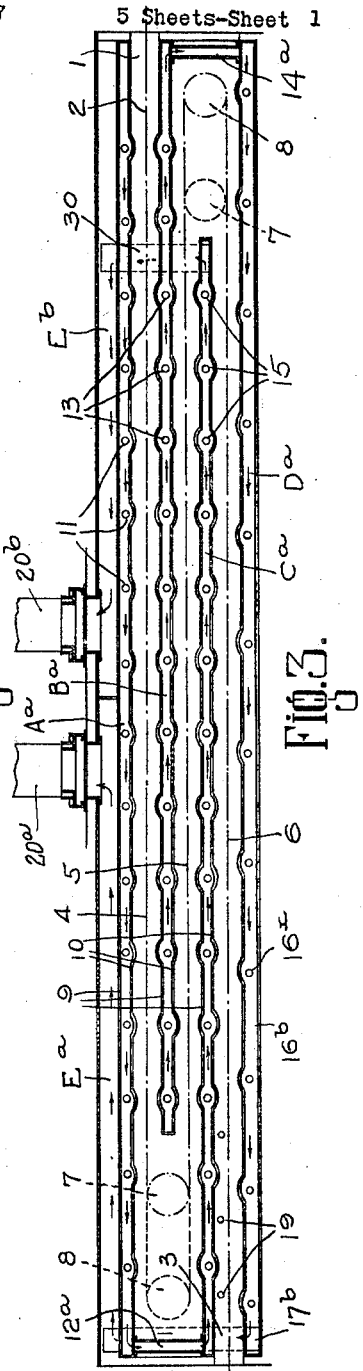
Inventor:-
Edward M. Crosland
By Hubert Mason
attys.

Jan. 31, 1928.

E. M. CROSLAND 1,657,959

OVEN FOR BAKING, DRYING, AND OTHER HEATING OPERATIONS

Filed Jan. 18, 1927    5 Sheets-Sheet 2

Inventor:
Edward M. Crosland
By [signature]
Atty.

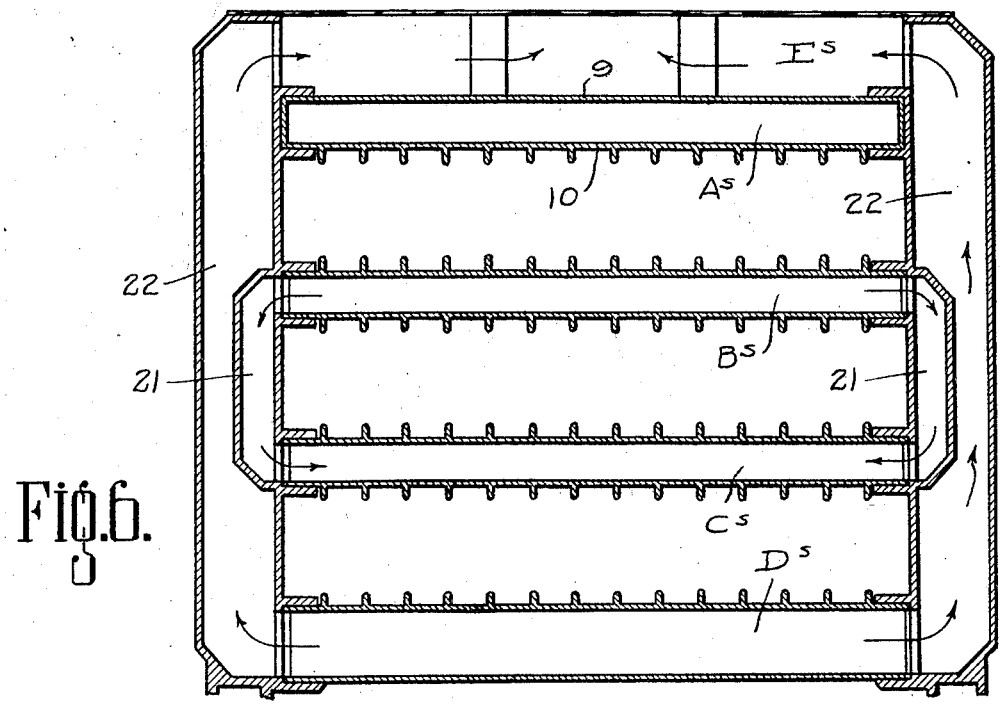

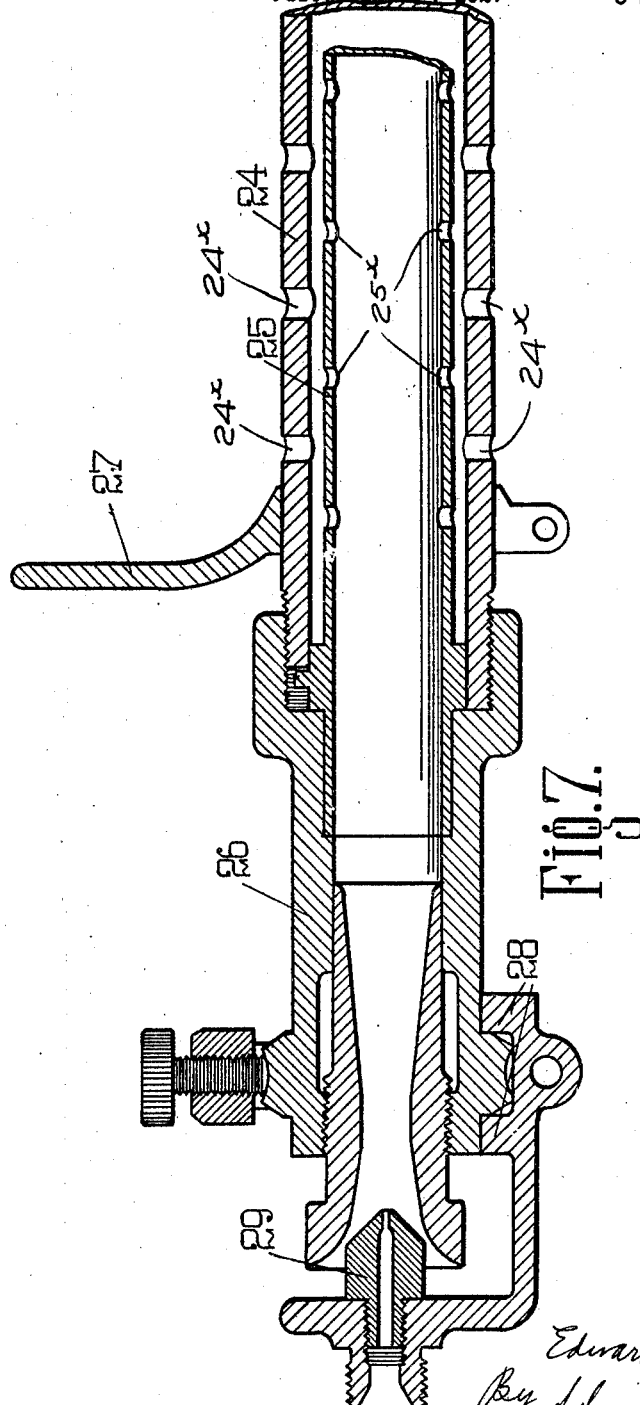

Patented Jan. 31, 1928.

1,657,959

UNITED STATES PATENT OFFICE.

EDWARD MILNER CROSLAND, OF NEWTON-LE-WILLOWS, ENGLAND.

OVEN FOR BAKING, DRYING, AND OTHER HEATING OPERATIONS.

Application filed January 18, 1927, Serial No. 161,772, and in Great Britain January 4, 1926.

The present invention relates to improvements in heating, drying or baking ovens and more particularly to ovens heated by the combustion of gas and where the material or goods to be baked are situated in multiple tiers, that is to say, they do not lie in any one horizontal plane but in tiers on different planes one above the other.

In multiple tier ovens considerable difficulty has been experienced in heating the bottom of the oven, as due to the natural tendency of hot gases to rise, it results in the top of the oven soon becoming hotter than the bottom.

Further in such multiple tier ovens the space for the escape or passage of the gases of combustion and for the steam rising from the goods being heated is somewhat limited and in consequence of this the rising heated gases and steam tend to escape with a considerable velocity causing draught to be set up with a consequent detrimental and uneven effect on the baking of the goods.

With a view to avoiding these disadvantages and obtaining a greater efficiency of heating from the gas, according to the present invention the goods within the multiple tier oven are heated on both sides by means of radiators, that is to say, there may be one more tier or row of radiators than tiers or rows of goods to be baked in the oven.

Further by the present invention the radiators are connected together so that gases of combustion after passing along one radiator will pass to the radiator situated below this, whereupon the gases will travel along this lower radiator and then by a passage to a still lower radiator until the bottom radiator is reached whereupon the gases pass into the waste gas flue.

It will thus be seen that by separating the gases of combustion from the goods to be baked, and by causing the gases of combustion to travel downwardly, i. e. in the opposite direction to the normal flow of hot gases the gases of combustion will be used to a greater extent involving less waste, in that the lower radiators will receive heat from the descending gases of combustion in addition to the heat generated by the burners situated in such lower radiators. Further, the heat radiated by the lower radiators will assist in heating the whole of the oven as in the case of an oven heated directly by burners, in that the air within the oven and external of the radiators will rise when heated towards the top of the oven. By the construction of the present invention it is found that after the oven has been heated for some time it is possible to maintain the necessary temperature at the lower portion of the oven solely by the descending gases of combustion within the radiators thus dispensing with the burners within such lowly situated radiators for the time being.

The invention is more particularly described with reference to the accompanying drawings, in which:—

Figure 1 is a longitudinal sectional elevation through one form of oven.

Figure 2 is a longitudinal sectional elevation, through a modified form of oven.

Figure 3 is a longitudinal sectional view through a further modified form of oven.

Figure 6 is a similar end cross section on the line 6—6 of Figure 4.

Figure 7 is a part longitudinal section of a convenient form of burner.

Figure 4:
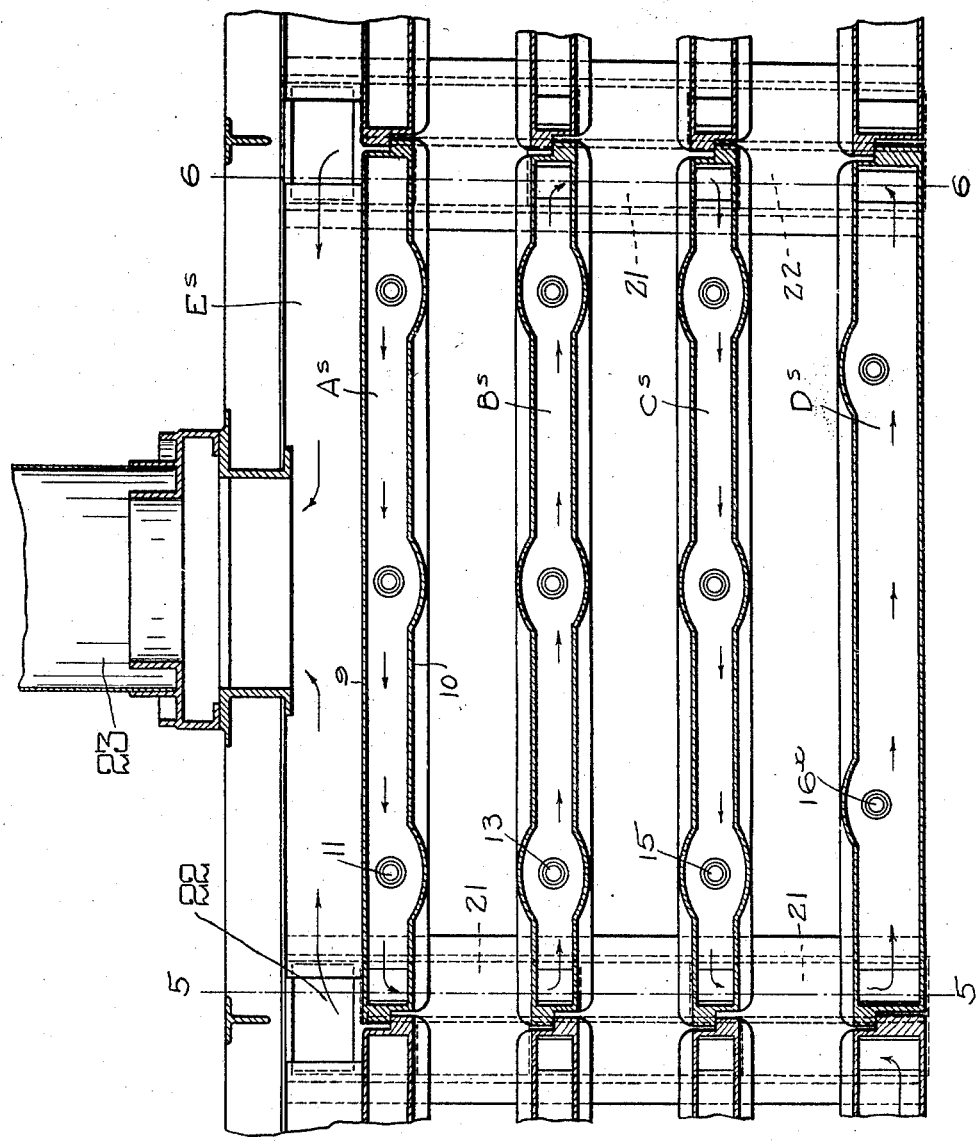
Figure 4 is a partial sectional longitudinal elevation of an oven, showing one portion only of the oven, the complete longitudinal section of the oven being made up of a number of the sections of this figure.

The goods to be baked, heated, dried or otherwise treated in the oven, are passed into this at a point 1 upon a conveyor 2 moving continuously or step by step and passing through the oven in a number of tiers to leave it through the delivery opening 3. The oven is divided longitudinally into a number of chambers 4, 5, 6, through which the conveyor 2 is guided by sprocket wheels 7, 8 or the like means. The partitions between these chambers are hollow, and are formed of upper walls 9, and lower walls 10 forming flues through which the heating gases can pass. It will thus be seen that the oven comprises the heating chambers A, B, C, D, which define the goods chambers 4, 5, 6 between them.

The products of combustion from burners 11 arranged between the walls 9, 10 pass along between these right along the oven in the upper tier heating the top of the biscuits or the like material on the conveyor 2. These gases then pass down a vertical flue 12 and mingle with gases from burners 13 arranged in the next hollow partition wall to heat the lower face of the conveyor 2.

These gases then having passed substantially the full length of the oven pass down through the vertical flue 14, and mingle with the products of combustion from burners 15 in the next lower partition wall heating the underside of the conveyor 2, as it passes back along the oven and so on, for any desired number of tiers.

When the gases of combustion have passed along the lowermost or floor partitions 16 of the oven they pass upwards through flues 17 to the flue E forming the top of the oven and communicating with a chimney 20. Naked burners 19 may be provided in the goods chamber 6 adjacent the outlet 3 for the purpose of affording a final crusting or browning on the bread or biscuit, if so desired. In the lower heating chamber D formed by the partition 16 are likewise provided the burners 16$^x$ for the purpose of heating the lower surface of the conveyor 2 on its passage through the goods chamber 6.

It is preferred to so arrange the construction of the oven that the direction of flow of the products of combustion is reversed in stages along the oven. Such a construction is shown in Figs. 2 and 3 which are different sections taken longitudinally of one and the same oven. It will be noted that the direction of flow of gases is from left to right in each of the heating chambers C$^a$, B$^a$, and from right to left in the heating chambers D$^a$, A$^a$. It will further be noted that the gases pass from the right hand end of the chamber A$^a$, to its left end downwardly in a flue 12$^a$ and then to the right in the heating chamber C$^a$: or from the left hand end of the heating chamber B$^a$ toward the right and downward in a flue 14$^a$ and then to the left in the heating chamber D$^a$. It will thus be seen that there are two independent heating currents of gas within the oven. It is preferred to divide the oven longitudinally by partitions, furthermore, so that the gas arriving in the right hand end of the heating chamber C$^a$ in one compartment may be directed downwardly into the lower heating chamber D$^a$: while in another compartment they will be directed upwardly through a flue 30 to the right hand portion E$^b$ of a conduit which leads to the stack 20$^b$: while the body of gases passing upwardly in the flue 17$^b$ succeed to the conduit E$^a$ and thence to the stack 20$^a$. The direction of the arrows indicates the direction of flow of the hot gases.

Figure 5:
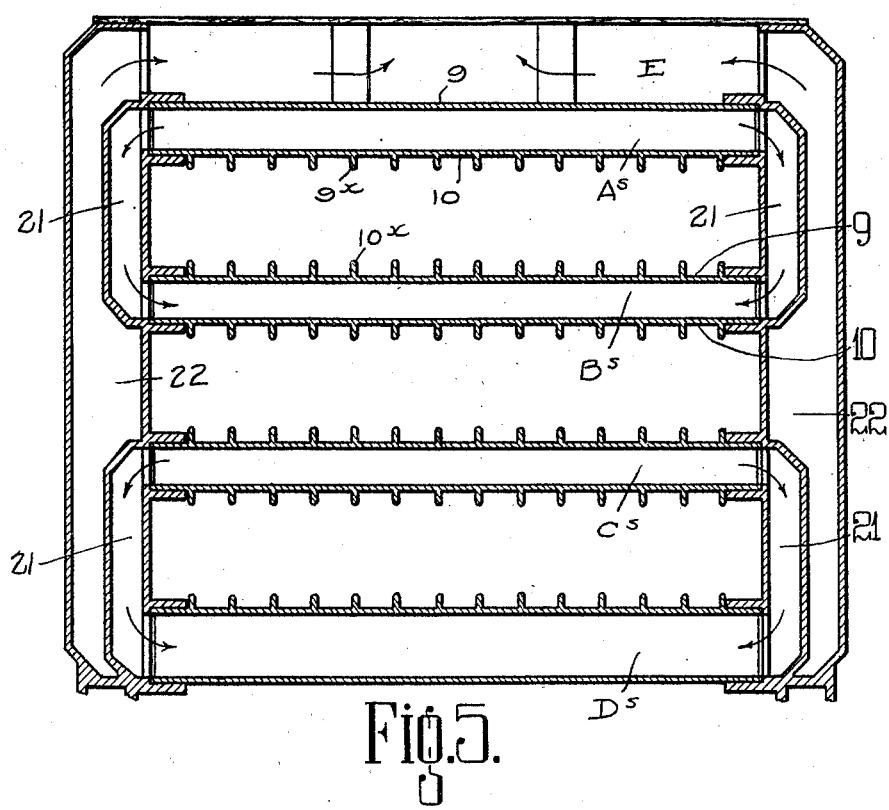
Figure 5 is an end cross section on the line 5—5 of Fig. 4.

In the modified form of construction shown in Figures 4 to 6 comparatively small radiators are used along the length of the oven, each of these small radiators being connected at its ends to a similar small radiator situated immediately below it by means of short connecting flues 21, which allow the gases to finally pass up the outer connecting flues 22 up into the chimney 23. By subdividing the length of the oven into such small sections of radiators the control of these is considerably assisted.

The partition walls 9 and 10 in either case, may be ribbed as shown at 9$^x$, 10$^x$, to increase the effective radiating surface. In both cases it will be seen that the products of combustion are completely removed from all possible contact with the goods being baked, and further that the oven can be controlled, so that the products of combustion travel in a downwards direction through the lower radiators whereby as much heat as possible can be abstracted from the gas before it reaches the exit flue to counteract the normal tendency of the heated products of combustion to rise.

The present invention may also be applied if desired to ovens where the goods to be treated remain stationary, and where the treatment involves either heating, baking or drying.

In certain cases it may be desirable to omit the walls 9, 10, as regards for instance, the top flight only, so that the products of combustion along this top row not having far to travel will not have such a great disturbing effect on the biscuits or the like material passing below them.

A convenient form of burner comprises an outer tube 24 having perforations or slots 24$^x$ in it along its length, which tube extends transversely across the oven within the heat chamber within an enlarged cross section thereof by preference: within the outer burner tube 24 is located an inner burner tube 25 which is fed at the end with gas-air mixture and is likewise provided with holes or slots 25$^x$ therein. The holes, slots or like perforations 24$^x$, 25$^x$ are disposed in staggered relation so that they do not coincide respectively, and the gas leaving the tube 25 is forced to follow a circuitous path before it escapes from the perforations 24$^x$ in the outer tube 24, and thus an efficient mixing and distribution of the gas is obtained. The tubes 24, 25 are held fixedly with regard to each other, while their assembly may be swiveled about, together with the burner body 26, by means of the handle 27, by means of fixed bearings 28 located upon the fixed gas pipe connection and the nozzle 29.

I declare that what I claim is:—

1. A multiple tier oven including a moving conveyor and means to guide said conveyor in said oven in multiple flight, and internally heated radiators forming walls between the successive flight chambers, each of said walls being composed of a plurality of individual sections, said section walls for the successive flights being connected together by lateral vertical conduits comprising inner and outer conduits, the inner conduits serving to lead the gases downward from one section wall to a section wall beneath it and the outer conduits serving to lead the gases upward from a lower section to the discharge flue.

2. A multiple tier oven including a moving conveyor and means to guide said conveyor in said oven in multiple flight, and internally heated radiators forming walls between the successive flight chambers, the radiators forming said walls being divided along substantially vertical planes into a plurality of sections, each of said sections having at one end thereof conduits to establish communication between certain of said radiators and the respective radiator immediately below, and at the other end with conduits establishing communication between said latter rediators and a radiator beneath the same, so that in each of said sections a flow of gases of combustion occurs successively along an upper radiator, thence downward to a lower radiator and in the reverse direction along said lower radiator, and then downward into a still lower radiator and return in the first direction, and means for withdrawing the combustion gases from the lowermost radiator to a discharge flue.

3. A multiple tier oven including a moving conveyor and means to guide said conveyor in said oven in multiple flight, and internally heated radiators forming the walls of the successive flight chambers, said radiators being divided substantially on vertical planes into a plurality of sections, each of said sections being connected at the respective ends by a conduit structure having inner and outer passages, the inner passages serving for passing gases from an upper radiator to a lower radiator of the section, and said outer passage serving for passing the gases from a lower radiator to the discharge flue.

In witness whereof I have hereunto signed my name this 5th day of January, 1927.

EDWARD MILNER CROSLAND.